- - - - - Flow of Solids
· · · · · Flow of Gases

INVENTORS
Marc Griffon du Bellay
Joseph Sanlaville
BY

THEIR ATTORNEYS

Aug. 15, 1967   M. G. DU BELLAY ETAL   3,336,109
PROCESS FOR MAKING AN ANHYDROUS ALUMINA PRODUCT CONSISTING
PRINCIPALLY OF ALPHA ALUMINA FROM ALUMINA HYDRATE
Filed Dec. 5, 1963   2 Sheets-Sheet 2
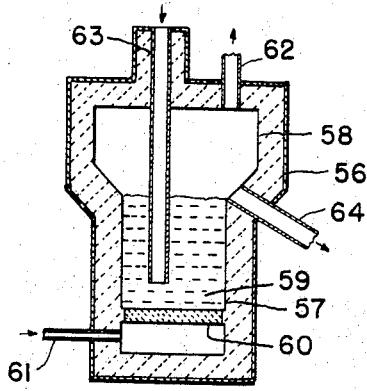
Fig. 3
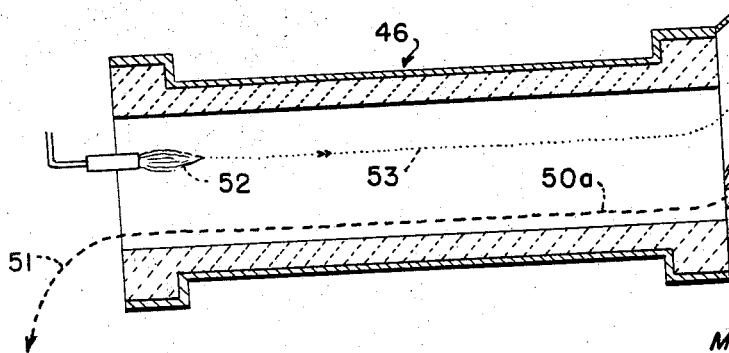
Fig. 4
----- Flow of Solids
........ Flow of Gases
INVENTORS
Marc Griffon du Bellay
Joseph Sanlaville
BY
THEIR ATTORNEYS 3,336,109
PROCESS FOR MAKING AN ANHYDROUS ALUMI-
NA PRODUCT CONSISTING PRINCIPALLY OF
ALPHA ALUMINA FROM ALUMINA HYDRATE
Marc Griffon du Bellay, Saint-Genis-Laval, and Joseph
Sanlaville, Pierre-Benite, France, assignors to Societe
d'Electro-Chimie, d'Electro-Metallurgie et des Acieries
Electriques d'Ugine, Paris, France, a corporation of
France
Filed Dec. 5, 1963, Ser. No. 329,344
Claims priority, application France, Oct. 28, 1959,
808,661
5 Claims. (Cl. 23—142)

ABSTRACT OF THE DISCLOSURE

A two step process for making an anhydrous alumina consisting of at least 65% alpha alumina from alumina hydrate. In the first stage alumina hydrate is dehydrated by heating to a temperature of 400° C.–1015° C. for 2–100 seconds and in the second stage the product is recrystallized into anhydrous alumina by heating to a temperature of 900° C.–1200° C. and higher than that employed in the first stage for a period of 10–180 minutes.

---

This application is a continuation-in-part of our application Ser. No. 64,521, filed Oct. 24, 1960, now abandoned, and relating to, "Process and Apparatus for Making an Anhydrous Alumina Product Consisting Principally of Alpha Alumina From Alumina Hydrate."

This invention relates to a process for making an anhydrous inert stable alumina product consisting principally of alpha alumina from mono- or tri-hydrates. Such an anhydrous product is suitable for electrolytic production of aluminum.

The term "calcination" has often been used to specify any thermal treatment transforming an alumina hydrate into another kind of alumina, anhydrous or partly hydrated, whatever the temperature reached by the products or the heating gases, and whatever the experienced transformation degree and the composition of the obtained product may be. So, this term "calcination" which specifies processes different from one another by the phenomena they carry out and the result obtained is greatly confusing. Effectively, in the case of alumina hydrates, the increase in temperature successively provokes elimination of wetness, elimination of constitution water in several stages, and also various transformations in the crystallography of the heated product. The obtained results are most diverse, the various prior-known processes leading sometimes to reactive products—as catalysts or drying products generally obtained at average temperature, between 400° C. and 700° C. for instance—sometimes to partly or totally crystallized products which must be heated to high temperatures—900° C. to 1300° C., for instance—sometimes to abrasive products, and sometimes to products for special uses—for instance, extremely fine products to be incorporated in tooth-pastes.

Numerous publications have been devoted to the study of the thermal treatment of hydrated alumina. As a consequence of the knowledge thus acquired, the phenomena which occur in such thermal treatment may be explained very clearly. When hydrated alumina is heated, the temperature at which dehydration begins differs according to the starting product. For example, for hydrargillite or bayerite, dehydration begins at about 200° C., and for boehmite, it begins at about 500° C. The dehydration speed increases notably with increase in temperature, and in the case of hydrargillite or bayerite, is so rapid that when a temperature of 400° C. is reached, a few seconds are sufficient to eliminate at least 85% to 95% of its water content. The solid is then composed of an amorphous phase which is almost anhydrous and has a small proportion of boehmite as revealed by X-ray analysis. If heating is carried on to a higher temperature, an amorphous anhydrous product is obtained, then a crystallized product.

Applicants have observed that the processes for producing amorphous anhydrous alumina and for making a product containing crystallized alpha alumina are different since they carry out two phenomena—dehydration and recrystallization, dehydration comprising elimination of wetness and of the constituent water.

Furthermore, applicants have observed that both phenomena are fundamentally different from each other. Dehydration is highly endothermic and is very rapid; while recrystallization is exothermic and proceeds slowly.

In some prior-known processes, the thermal treatment of hydrated alumina is carried out in rotary furnaces. In such furnaces, when the desired product must contain crystallized alumina of the alpha form, dehydration and recrystallization are performed without making it possible to delimit the crystallization zone clearly in respect to the dehydration zone. The wet hydrated alumina is fed into one end of the furnace and a burner is located at the opposite end thereof whereby the product and the gases flow counter-current through the furnace. Such a method of operation is illogical according to our observations, since two reactions of opposed characteristics are carried out in the same apparatus. Besides, the hot gases are in contact with a product which cannot absorb any heat since the recrystallization to which it is submitted is exothermic, while the heat exchange rate decreases progressively near the end of the furnace where the solid material is introduced and where heat is particularly needed. Furthermore, a considerable volume of steam is generated near the gas outlet, causing entrainment of fine solid particles which must be recuperated and recycled, thus resulting in loss of heat and a low thermal yield. The dehydration phenomenon, which requires a larger supply of heat, consequently takes place in the part of the furnace where the heating gases are already partly cooled. The necessary heat is provided at the inlet of the furnace and it passes mostly useless through the hot zone of the furnace, which leads to the necessity of using large size furnaces and employing only a relatively small charge of material in the furnace, thereby causing an increase of thermal losses. Also a relatively large volume of gas passes through the furnace and the dust entrained in the gases has to be recuperated in order to make the process economical.

In order to avoid these difficulties, it would obviously be possible to consider locating the burner at the same end of the furnace at which the hydrated alumina is introduced. The dehydration could then be effected under good conditions but because of the endothermicity of the reaction, it would be impossible to raise the temperature of the anhydrous alumina to a temperature high enough to cause recrystallization into the form of alpha alumina. Another disadvantage of such an arrangement would be a very considerable entrainment of dust by the hot gases due to the rapid liberation of steam which would break up the solid into particles and put them into suspension.

It has also been proposed to apply to the thermal treatment of alumina hydrates the technique of the fluidized beds. Generally, this technique consists in sending through a divided solid a gaseous stream at such a speed that the solid particles may be strongly agitated without being entrained. The gas circulation speed must be within rather narrow limits depending chiefly on the size of each particle. When the solid particles are small, the gas circulation speed, i.e., the gas flow, must be low. This technique has been particularly proposed to ensure heat exchange between a divided solid and a gas. A great temperature homogeneity is obtained in the different zones of the solid, but the finer the solid particles are, the lower is the gas circulation speed and the flow per traversed surface unit, thereby limiting the quantity of heat exchanged. This practical disadvantage is not pointed out in the texts relating to this technique, but it becomes obvious as soon as one tries to use the technique industrially, for the required apparatuses have a low exchange capacity for their dimensions.

Further difficulties appear when this technique is applied to thermal treatments during which, as in the case of alumina hydrates, large volumes of gases or steam are evolved. Specifically, if the heating gases flow successively through beds of increasing wetness, the gaseous volume increases progressively, proportionately to the volume of steam evolved. In order to avoid reaching the last bed at too high a speed, which would case an important entrainment of solid particles (all the more easily entrained as they are drier), it is indispensable to have at the inlet of the first bed a low speed which reduces the practical capacity of the apparatus. To avoid this disadvantage, it has been proposed to distribute the admission of the heating gases among the various solid beds; such a distribution allows different temperatures for each successive bed, but its main purpose is to maintain near one another the speeds of the gaseous mixtures passing through each solid bed. Thus, the amounts of hot gases introduced or produced in each bed, the temperatures of the beds, and the state of the products coming out of each bed are determined, not in function of the desired transformation degree, but essentially with a view to obtaining the gas circulation speed necessary to maintain the fluidized state. In fact, the successive beds are generally of comparable thickness and the duration of the stays in each bed are not much different.

To produce highly activated and almost anhydrous alumina, it has been proposed to submit alumina hydrate to a rapid heating. The product thus obtained keeps its absorbing properties, even if it is subjected afterwards to such a heating temperature as 500° C. It has been observed that, contrary to what happens for usual activated alumina, the conversion to alpha alumina of the products dehydrated by instantaneous dehydration avoids intermediary formation of kappa alumina.

Our invention obtains from alumina hydrates a powdered inert alumina containing a high proportion—for instance, 65% and up to 90%—of crystallized alpha alumina, and preferably 80%–90% crystallized alpha alumina. Such a percentage corresponds to a trihydrate obtained by the Bayer process, to a complete crystallization. Effectively, such hydrates always contain a little caustic soda which, when heated, forms with a portion of the alumina, crystals of the formula:

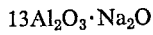

$$13Al_2O_3 \cdot Na_2O$$

Additionally, the invention effects this transformation with a reduced consumption of heating agent. Also, there is an efficient utilization of the heat produced by the recrystallization of the previously obtained amorphous anhydrous product. Furthermore, our method allows one to carry out dehydration in an apparatus of high thermal efficiency, apparatus which takes up small space relative to output and has high thermal efficiency and relatively low construction costs.

According to the invention, dehydration and recrystallization form two separate stages of the process wherein each is performed in an enclosure at an appropriate temperature. The major part—and preferably the totality—of the necessary heat in introduced into the dehydration apparatus and the hot gases effect a heat flow through the apparatus counter-current to movement of the product to be dried, and flow out of it as low a temperature as possible. Accordingly, the recrystallization apparatus receives only a very small portion of the total heat, and preferably no heat at all. The size of this apparatus is sufficient for the previously dried product or anhydrous alumina to stay therein as long as necessary for the desired recrystallization, and it is all the more insulated as its size is to be smaller and the heat supply therefor preferably avoided. This duration of stay depends upon the temperature maintained in the crystallization enclosure and upon the desired crystallization degree. It may be lowered by the presence or the addition of known mineralizing elements. For usual industrial trihydrates, without any addition of mineralizing agents, it is generally near one hour at 1200° C. and two hours at 1100° C. In some instances, the anhydrous alumina is kept in the recrystallization apparatus for up to three hours.

In the process of our invention, dehydration is carried out very rapidly by using an exchanger which allows a very rapid heat exchange between the product to be dried and the heating gases. Any apparatus ensuring a massive exchange may be utilized. The product temperature after the dehydration stage ranges between 500° C. and 1000° C., and preferably between 900° C. and 1000° C., and its residual water content is below 15%, preferably below 5%. The duration of stay of the product in the dehydration apparatus is as short as possible and its depends, to some extent, on the yield required from the apparatus, thereby on its size. Thus, in a dehydration apparatus formed of cyclones traversed successively by the product on dehydration, the total duration times were:

Near 2 to 4 seconds for traverse through all three cyclones, each 200 mm. in diameter and yielding 50 kg./hour of dry product;

Near 10 to 15 seconds for traverse through all three cyclones, each 700 mm. in diameter and yielding 700 kg./hour of dry product;

Near 60 seconds for traverse through all four cyclones, each 1.80–3.00 meters in diameter and yielding 6–17 tons/hour of dry product.

For larger apparatus, the time interval extends up to 100 seconds.

According to the invention of our process, the product, almost completely dehydrated, passes directly from the dehydration enclosure to the recrystallization enclosure. This enclosure is kept at a temperature between 900° C. 1200° C., preferably near 1100° C., and at a temperature higher than that employed in the rapid dehydration. For that purpose, it is formed of a carefully insulated apparatus and the heat produced by the recrystallization forms the normal source of calories for the maintenance at the desired temperature. If, for economical or construction reasons, the insulation is reduced, it is possible to introduce a limited quantity of heat into the recrystallization enclosure, for instance by injecting thereinto a small amount of hot gases which afterwards participate in the dehydration.

To carry out the second stage of the process according to the invention, various devices are utilized. For example, we utilize a cylindro-conical tower in which the solid forms a thick and relatively dense layer and flows by gravity. Such apparatus is easily heat-insulated; however, it is often difficult to ensure a regular and uniform flowing down of the product. Rotary devices such as rotary furnaces are suitable, although their heat-insulation is more difficult to achieve and they make it obligatory to accept a small calory deficit and to introduce the anhydrous alumina at a little lower temperature (600° C. for example), and to maintain with the help of a burner a small calory supply. At last, the preferred device is a fluidized bed, satisfactory from the standpoint of the heat insulation as well as the solid circulation, and in which the presence of a gas circulation ensures a good working regularity.

As in the conventional processes, it is possible to introduce, at the same time as the anhydrous alumina, a mineralizing agent, such as hydrofluoric acid, calcium fluoride, aluminum fluoride, etc.

The calories contained in the recrystallized anhydrous product flowing out of the apparatus can be recovered in devices known and utilized in the first stage in various manners, for example, in the form of hot gases injected directly in the cyclones, in the form of secondary air feeding the burners, etc.

The advantage of the process according to the present invention in comparison with the prior-known processes, results from the separation into two distinct stages of the dehydration and recrystallization processes. This permits one to choose the particular apparatus which is most appropriate for use in each step. For instance, the use of static devices such as cyclone heat exchangers and fluidized beds considerably reduces the cost of the whole installation. The temperature of the major part, or preferably of the whole of the heating gases, may be lower since it need not be much above the recrystallization temperature. The cost of the operation and maintenance are considerably reduced in comparison with prior-known installations. On the other hand, the combustible consumption is reduced since the utilization of a heavy heat-insulating lining permits the lessening of the losses through the walls. The use of cyclone exchangers of high efficiency, lowers the smoke temperature below 200° C. Additionally, whereas in the conventional devices the weight of dusts entrained within the gas often exceeds 100% of the weight of produced alumina, this percentage, which only depends upon the efficiency of the cyclones, is easily maintained below 10% in the process of the invention. Finally, the anhydrous alumina obtained according to the present process has a perfectly homogeneous composition.

The accompanying drawings illustrate somewhat schematically various embodiments of the invention.

FIGURE 2b is a section taken on the line IIb—IIb of FIGURE 2a;

FIGURE 3 is a longitudinal section through a shaft furnace for carrying out the second stage; and FIGURE 4 shows another embodiment in which a series of cyclones and a kiln or rotary furnace are assembled, the former to carry out the first stage of the process, the latter to carry out the second stage.

Example 1

Figure 1:
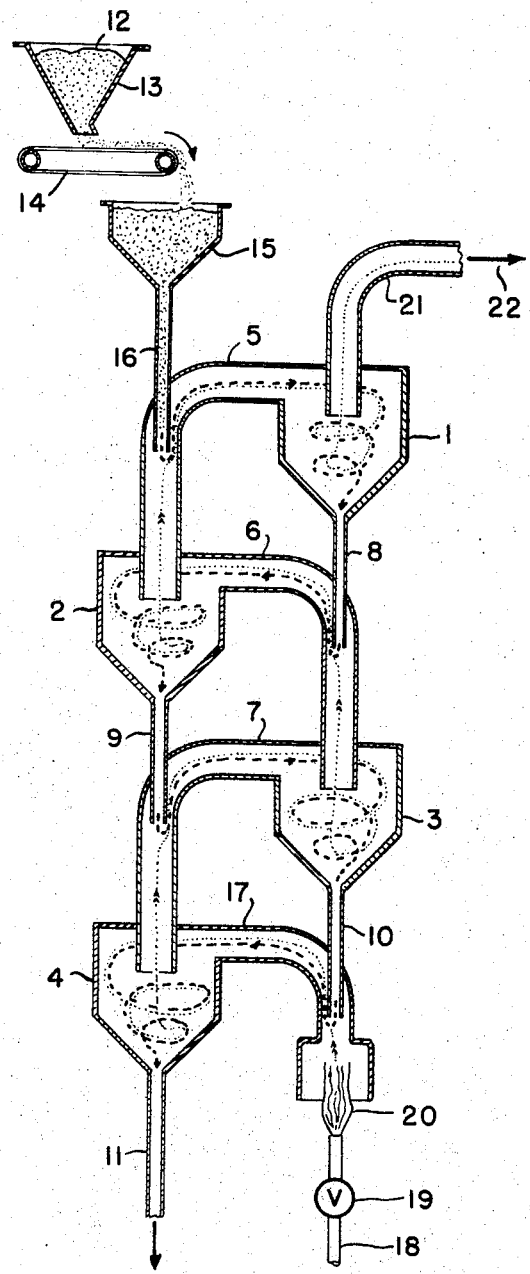
FIGURE 1 represents, as an example, a series of cyclones in which the first transformation stage is carried out.

The apparatus shown in FIGURE 1 comprises four cyclone heat exchangers 1, 2, 3 and 4. A conduit 5 connects heat exchangers 1 and 2, a conduit 6 connects heat exchangers 2 and 3, and a conduit 7 connects heat exchangers 3 and 4. Heat exchanger 1 has a discharge pipe 8 for solids; heat exchanger 2, a discharge pipe 9; heat exchanger 3, a discharge pipe 10; and, heat exchanger 4, a discharge pipe 11. The hydrated alumina 12, for example hydrargillite, in hopper 13 is fed by a band conveyor 14 to a hopper 15 which feeds it through a pipe 16 into the conduit 5. The product flows successively through conduit 5 and heat exchanger 1 under the action of the hot gases flowing out of exchanger 2; then it flows out of exchanger 1 through discharge pipe 8, and flows through conduit 6, heat exchanger 2, discharge pipe 9, conduit 7, heat exchanger 3, discharge pipe 10, conduit 17, heat exchanger 4 and is discharged through discharge pipe 11. Propane or other fuel is fed through a pipe 18 provided with a valve 19 to a burner 20 located in the lower end of the conduit 17. The products of combustion from the burner 20 flow successively through conduit 17, heat exchanger 4, conduit 7, heat exchanger 3, conduit 6, heat exchanger 2, conduit 5, heat exchanger 1 and discharge through a conduit 21, as indicated by the arrow 22. The upwardly flowing products of combustion introduced into the lower end of the conduit 17 entrain particles of solid material falling from the lower end of the discharge pipe 10 and carry the solid material into the heat exchanger 4. The hot gases and solid material circulate in the heat exchanger 4 and the particles of solid material fall to the bottom of the exchanger 4 and are discharged through the discharge pipe 11. The hot gases in heat exchanger 4 flow upwardly in conduit 7 and entrain particles of solid material falling from the lower end of discharge pipe 9 and carry them into the heat exchanger 3, from which the solid particles separate and are discharged through the discharge pipe 10. Similar actions occur in the conduit 6, heat exchanger 2, conduit 5 and heat exchanger 1.

Heat exchangers 1 and 2 are made of sheet iron provided with external insulating material, while exchangers 3 and 4 are provided with internal brickwork linings.

The wet hydrargillite with an inlet temperature of about 50° C. was fed into the apparatus at a rate of 700 kg./h., calculated as $Al_2O_3$. The burner 20 produced from 1500 to 1600 kg./h. of gas at 1200° C. The temperature of the dehydrated alumina discharged from heat exchanger 4 through the discharge pipe 11 was about 975° C., while the temperature of the gases discharged through conduit 21 was about 200° C. The dehydrated alumina did not contain any more than 0.5% water. The diameters of the conduits connecting the various heat exchangers 1, 2, 3 and 4 were so dimensioned that the hot gases flowed therethrough at a speed of ten meters per second at each step of the process. The dehydration was effected almost exclusively in heat exchangers 2 and 3.

Figure 2A:
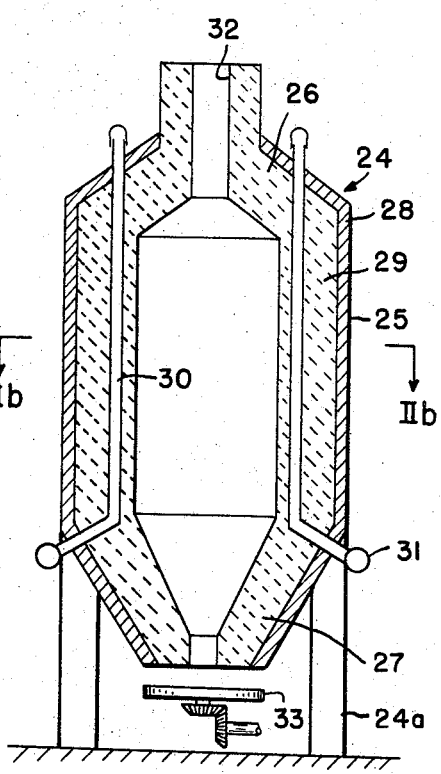
FIGURE 2a is a longitudinal section through a tower for carrying out the second stage.
Figure 2B:
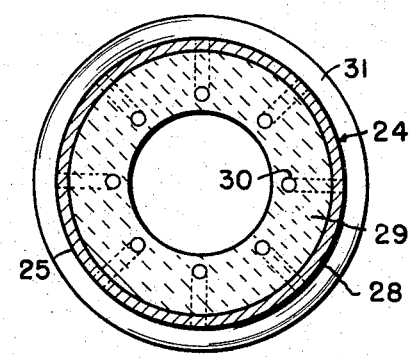

Referring now to FIGURES 2a and 2b, there is shown a vertical tower 24 having a cylindrical part 25, a conical entrance part 26, and a conical part 27 at its lower end, the angle of the cone of the lower part being between 60° and 70°. The furnace comprises a sheet metal casing 28 and a thick lining 29 of refractory bricks. The refractory bricks forming the inner side of the lining 29 were of a character having high resistance to abrasion, the lining 29 having low thermal conductivity and low heat capacity. The lining 29 was provided with vertical channels 30, these channels being provided at their lower ends with burners 31. The body of the furnace was supported by three masonry feet 24a.

The lining 29 was raised to a temperature of about 1000° C. by operating the burners 31 and before dehydrated alumina coming from the discharge pipe 11, shown in FIGURE 1, was fed at a temperature of about 975° C. through the inlet 32 of the furnace 24 at the rate of 700 kg./h., the burners were shut off. The time of stay in the furnace 24 was about 120 minutes. The recrystallized material was discharged from the bottom of the furnace by means of a rotary discharge device 33.

In normal operation, the obtained product was discharged continuously at the base of the furnace by the discharge device 33 and sent to a cooling device, not shown. The temperature of the product was 1075° C. It contained 75% alpha alumina and small amounts of theta, kappa and beta alumina.

The cost of fuel used during the test was about 20% less than the cost of fuel normally used in carrying out the process in a rotary furnace (which averages 120 grams of fuel per kg. of calcined alumina). An installation according to the present invention and of a capacity of ten tons per hour for instance, would result in a still lower fuel cost per ton of material treated.

Example 2

In this example, the first stage of the process is carried out in an apparatus similar to that described in Example 1. The second stage is carried out in an apparatus represented in FIGURE 3.

The wet hydrargillite, having at the inlet a temperature of about 60° C., is introduced into the apparatus at the rate of 700 kg./h., calculated as $Al_2O_3$. The burner 20 discharges 1450 kg./h. of gas at 1300° C. The dehydrated alumina coming out of the lower cyclone 4 does not contain any more than 0.3% water and its temperature is about 1015° C.; whereas, the gases flowing out of the upper cyclone 1 are at about 150° C.

Referring now to FIGURE 3, it illustrates a strongly heat-insulated enclosure 56, containing a cylindrical cavity 57, enlarged at the upper part 58. The alumina in the course of recrystallization constitutes a bed 59 supported by a porous refractory plate 60. A pipe 61 enables gases to be led into the cylindrical chamber, below the porous plate; their evacuation being ensured by the pipe 62. The solid is introduced into the cylindrical chamber, above the porous plate and near this latter, through the pipe 63; it is discharged through pipe 64.

The anhydrous alumina coming out of the cyclone 4 through the pipe 11 is introduced into the chamber 57 through the pipe 63. It flows into the lower part of the bed 59, maintained in the fluidized state by the gas inlet 61. The gas is distributed over the whole section of the chamber due to the porous plate 60. The fluidized state of the alumina layer ensures a regular flowing of the introduced product and renders the bed temperature homogeneous. The bed level is maintained constant due to the overflow pipe 64 which ensures the discharge of the recrystallized alumina. The gases leaving the bed 59 expand in the enlarged part of the chamber 58, allowing thus the settling of the entrained dust and the gas then discharges through the pipe 62. It is sent into the conduit 17 of the cyclone 4 of FIGURE 1. The hot alumina discharged through the pipe 64 is directed to cooling devices, not shown. Its temperature is about 1150° C., and it is constituted by 80% alpha alumina.

The dimensions of the bed 59 are such that the average stay duration of the solid in the device does not exceed 15 minutes.

The consumption of fuel oil, in that case, is about 95 kg. per ton of produced calcined alumina, taking into account the recovery of the calories of the solid coming out of the apparatus shown in FIGURE 3.

*Example 3*

The process is executed in apparatus illustrated by FIGURE 4.

The first stage is carried out in a series of three cyclones 40, 41, 42, working as the cyclones utilized in Example 1. The second stage is carried out in a rotary furnace 46 which is insufficiently insulated thereby causing heat losses. A small portion of the heating agent, 5% is introduced into the rotary furnace through burner 52, near the outlet of the recrystallized product. Hydrated alumina is fed through inlet pipe 47 to conduit 43 and the solid material then flows successively through heat exchanger 40, discharge pipe 48, conduit 44, heat exchanger 41, discharge pipe 49, conduit 45, heat exchanger 42 and discharge pipe 50, which is connected to one end of the rotary furnace 46. The solid material passes through the furance as indicated by the line 50a, and is discharged from the furnace as indicated at 51. The secondary burner 52 is located at the end of the furnace 46 which is opposite the end connected to the discharge pipe 50. The hot gases from burner 52 flow as indicated by the line 53 through the furnace counter-current to the solid material and into the conduit 45. A main burner 54 is located in the conduit 45. The hot gases pass upwardly successively through the conduit 45, heat exchanger 42, conduit 44, heat exchanger 41, conduit 43, heat exchanger 40, and are discharged through conduit 55. The hot gases, in passing upwardly in the conduit 45, entrain solid particles of material falling from the lower end of the discharge pipe 49 and carry them to the heat exchanger 42 in which the solid particles settle and are discharged to the rotary furnace 46 through the discharge pipe 50. Similarly, hot gases flowing upwardly in conduit 44 carry particles of solid material into the heat exchanger 41 from which the solid particles settle and are discharged through pipe 49. A similar action occurs in the heat exchanger 40.

In accordance with the present invention, each of the three cyclone heat exchangers 40, 41 and 42, was 1.8 meters in diameter and the small rotary furnace 46 was 10 meters long and 2.5 meters in diameter. Hydrated alumina containing 8% moistening water, i.e., 39.5% total water, was fed through the pipe 47 into the conduit 43 at the rate of 6 to 6.5 tons per hour. The secondary burner 52, located in the rotary furnace 46, supplied 20 kg. of fuel oil per ton of anhydrous alumina produced, and the primary burner 54, located in the conduit 45, supplied 82 kg. of fuel oil per ton of anhydrous alumina produced. Thus, the two burners required a total of 102 kg. of fuel oil per ton of anhydrous alumina produced.

The alumina issuing from the last cyclone heat exchanger 42 entered the rotary furnace 46 with a total water content of about 2% at a temperature of about 600° C. The alumina remained for two hours in the rotary furnace and its temperature at the discharge from the rotary furnace was 1100° C. Such alumina contained about 70% of alpha alumina.

The gas speed in the rotary furnace was about one-fifth that of the speed of the gas in a conventional rotary furnace for alumina calcination. Due to the slow speed of the flow of the gas through the furnace, the production of dust was nearly nil. The fines passing through the discharge conduit 55 were collected in a dust collector and amounted to only 12% by weight of the alumina charged through the pipe 47. These fines were returned to the rotary furnace by means not shown.

A conventional installation for alumina calcination constituted by a single rotary furnace would have required, for a similar production of 150 tons per day, a furnace 42 meters long and 2.1 meters in diameter. The fuel oil consumption would have reached 140 to 145 kg. per ton of product and the weight of the fines to be recycled would have been at least 100% of the produced alumina weight.

This invention is not limited to the preferred embodiments, but may be otherwise embodied or practiced within the scope of the following claims.

We claim:

1. A process for making an anhydrous alumina product consisting of at least 65% alpha alumina from alumina hydrate which comprises in a first stage and in a dehydrating zone heating said alumina hydrate to a temperature of about 400° C. to about 1015° C. to transform same into anhydrous alumina which has a residual water content below 15%, said alumina hydrate being subjected to said heating for about 2–100 seconds, passing said anhydrous alumina into a recrystallizing zone and there in a second stage subjecting said anhydrous alumina for 10 to 180 minutes to a temperature of about 900° C. to about 1200° C. and higher than that employed in said first stage to transform said anhydrous alumina and recrystallize it into anhydrous alumina consisting of at least 65% alpha alumina.

2. The process of claim 1 characterized by in said first stage heating said alumina hydrate by flowing hot gases counter-current to movement of said alumina hydrate in said dehydrating zone.

3. The process of claim 1 characterized by in said first stage heating said alumina hydrate by flowing hot gases counter-current to movement of said alumina hydrate in said dehydrating zone, and by in said second stage said anhydrous alumina being maintained at said temperature of said second stage in a heat insulated enclosure without supply of additional heat.

4. The process of claim 1 characterized by said anhydrous alumina having a residual water content of below 5%.

5. A process for making an anhydrous alumina product consisting of at least 65% alpha alumina from alumina hydrate which comprises in a first stage and in a dehydrating zone effecting a flow of hot gases therethrough, counterflowing said alumina hydrate through said dehydrating zone, said hot gases heating said alumina hydrate to a temperature of about 400° C. to about 1015° C. to transform same into anhydrous alumina which has a residual water content below 15%, said alumina hydrate being subjected to said heating for about 2–100 seconds, thereafter in a second stage subjecting said anhydrous alumina for 10 to 180 minutes to a temperature of about 900° C. to about 1200° C. and higher than that employed in said first stage to transform said anhydrous alumina and recrystallize it into anhydrous alumina consisting of at least 65% alpha alumina.

References Cited
UNITED STATES PATENTS

| | | |
|---|---|---|
| 2,750,258 | 6/1956 | Jukkola et al. _____ 23—142 |
| 2,799,558 | 7/1957 | Smith et al. _____ 23—142 |
| 2,833,622 | 5/1958 | Roberts et al. _____ 23—142 |
| 2,915,365 | 12/1959 | Saussol _____ 23—142 |
| 2,916,356 | 12/1959 | Keith et al. _____ 23—142 |
| 3,003,919 | 10/1961 | Broge _____ 23—141 X |

OSCAR R. VERTIZ, *Primary Examiner.*

H. T. CARTER, *Assistant Examiner.*